United States Patent [19]

White

[11] Patent Number: 4,507,741

[45] Date of Patent: Mar. 26, 1985

[54] COMPUTING DEVICE

[75] Inventor: Stanley A. White, Santa Ana, Calif.

[73] Assignee: Rockwell International Corporation, El Segundo, Calif.

[21] Appl. No.: 346,829

[22] Filed: Feb. 8, 1982

[51] Int. Cl.³ .............................................. G06F 15/36
[52] U.S. Cl. .................................... 364/554; 364/571; 455/63
[58] Field of Search ............... 364/200, 900, 554, 553, 364/571; 358/166; 455/63, 296, 307; 375/12

[56] References Cited

U.S. PATENT DOCUMENTS

| | | | |
|---|---|---|---|
| 3,983,320 | 9/1976 | Ketcham et al. | 358/166 |
| 3,996,421 | 12/1976 | Pruznick et al. | 358/166 |
| 4,212,072 | 7/1980 | Huelsman et al. | 358/166 |
| 4,315,319 | 2/1982 | White | 364/571 |
| 4,318,174 | 3/1982 | Suzuki et al. | 364/200 |
| 4,394,744 | 7/1983 | Wrench | 358/166 |

Primary Examiner—Jerry Smith
Assistant Examiner—Michael R. Fleming
Attorney, Agent, or Firm—H. Fredrick Hamann; Daniel R. McGlynn

[57] ABSTRACT

A digital data processor adapted to be responsive to an applied signal input ($x_n$) for generating an output signal indicative of a preselected function of the signal input, and comprising signal sampling memory means adapted to be responsive to an alternate one of the applied input signal and a clocked counter output as a read/write-address for generating a statistical amplitude density function d(x) representing the number of occurrences of an amplitude of a sampled input x. Digital attenuating means is interposed between a read-out and read-in of said memory means during sampling intervals in which said memory means is responsive to said clocked counter output for low-pass filtering the amplitude density function as to be dependent of the size of the sampled population of the sampled signal ($x_n$). There is further provided digital integration means responsive to said low-pass filtered amplitude density function during said sampling intervals for providing an output indicative of a normalized amplitude distribution function D(x) of the applied signal input ($x_n$). Additional functions of the input signal (x) can also be conveniently generated.

17 Claims, 5 Drawing Figures

COMPUTING DEVICE

BACKGROUND OF THE INVENTION

The concept of the invention relates to improved means for performing multiple function digital processing of an applied digital input signal, and adapted for implementation on a single microcircuit chip.

In the prior art of digital data processing, increasing amounts and kinds of data have been sought from the digital processor device, while industry standardization has sought to make uniform the sizes of the microcircuit chips commercially available for implementing such data processing. Accordingly, single integrated circuit means are desired for overcoming such circumstances of increased computing density and geometric (i.e., chip size) limitations.

For example, in U.S. Pat. No. 4,315,319 for a NON-LINEAR SIGNAL PROCESSOR, assigned to Rockwell International Corporation, assignee of the present invention, there is disclosed means for generating an amplitude distribution function D(x) from a normalized amplitude density function d(x). The usefulness and functional advantages of such device are fully set-out in such reference, which is hereby incorporated by reference. Such disclosed arrangement, however, requires the utilization of at least two random access memory (RAM) units, together with the associated costs and reduced computing density of such arrangement, in implementing the amplitude density d(x) function.

SUMMARY OF THE INVENTION

By means of the concept of the present invention, the above-noted limitations of the prior art are avoided and improved amplitude density and amplitude distribution function generating means is provided which requires no more than one random access memory (RAM) unit for implementation, whereby further and additional computation functions may be accommodated on a single microcircuit chip.

In a preferred embodiment of the invention, there is provided a single sampling memory means adapted to be responsive to an alternate one of an applied input signal and a clocked counter output as a read/write-address for generating a statistical amplitude density function d(x) representing the number of occurrences of an amplitude of a sampled input x. There is also provided digital attenuating means interposed between a read-out and a read-in of the memory means during sampling intervals in which the memory means is responsive to the clocked counter output for low-pass filtering the amplitude density function as to be independent of the size of the sampled population of the sampled signal ($x_n$).

By means of such an arrangement, the memory capacity of a single RAM is more fully and efficiently utilized in a time-multiplexed multiple mode fashion to provide a normalized amplitude density function d(x); and simplifications in the clocking arrangement for the multiplexed RAM are allowed, providing further engineering economies. Such economies thus allow the incorporation of further selected functions on the microcircuit chip.

These and other objects of the invention will become apparent from the following descriptions taken together with the accompanying drawings in which:

BRIEF DESCRIPTION OF THE DRAWINGS

In the drawings, like reference characters refer to like parts.

DESCRIPTION OF THE PREFERRED EMBODIMENT

A histogram of a signal may be defined as a number-of-occurrences plot. If normalized such that the area under the plot is unity, the histogram becomes the amplitude-density (frequency of occurrence) function, while the integrated amplitude-density function is the amplitude-distribution function, as described more fully in the above-noted U.S. Pat. No. 4,315,319. These two functions provide important information about the statistical profile of a signal, information such as the median, the probability that the signal is above or below a certain level, or the probability of finding the signal between a pair of predetermined values. Such information is useful in sophisticated nonlinear signal processing applications of detection theory, pattern recognition, automatic signal classification, and many others.

If an input signal, $x_n$, is quantized to B bits, then $x_n$ has $2^B$ allowable values. In order to construct a histogram for $x_n$ a $2^B$ word memory is needed, as indicated by the illustrated cooperation of elements 10, 11, 12 and 13 in FIG. 2.

Figure 1:
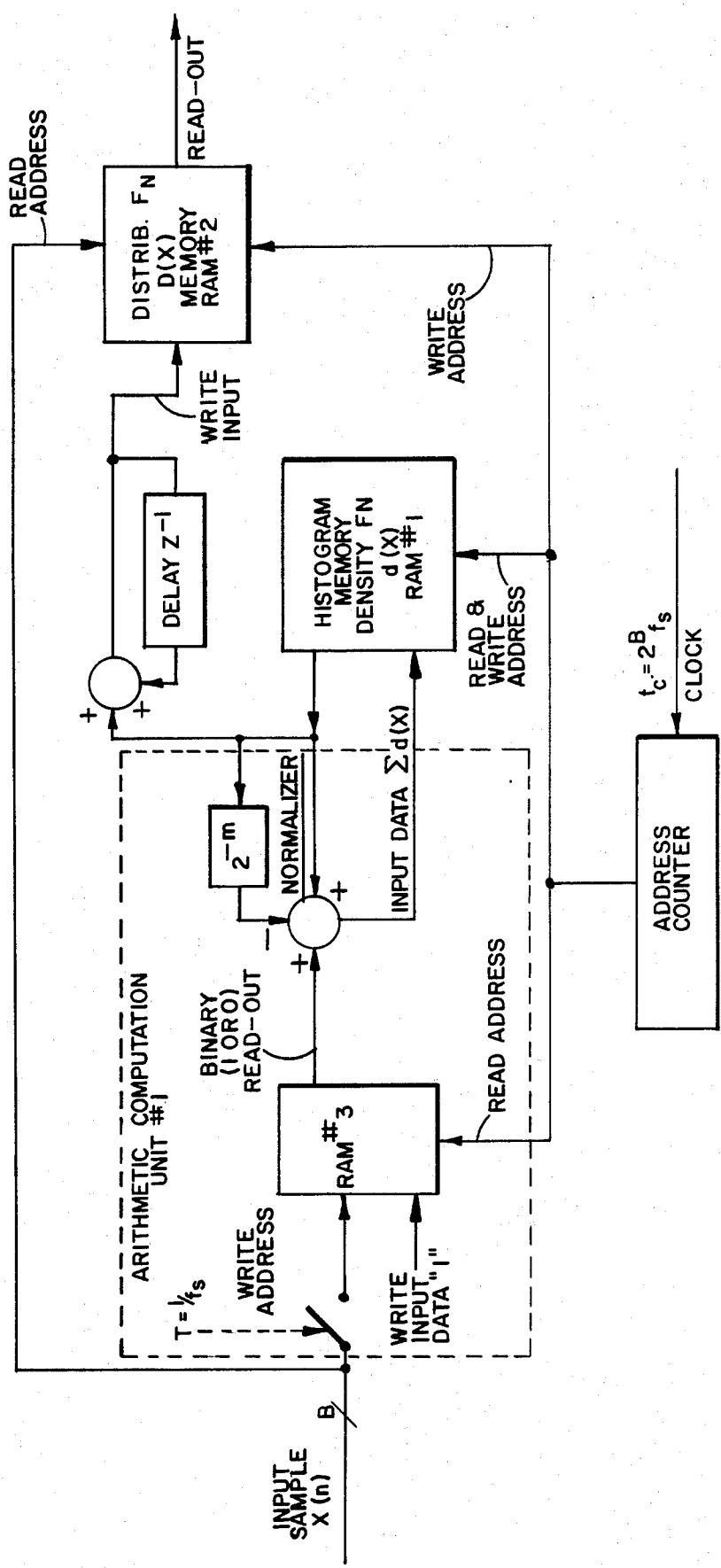
FIG. 1 is a block diagram of a prior art system for implementing normalized amplitude density and amplitude distribution functions.
Figure 2:
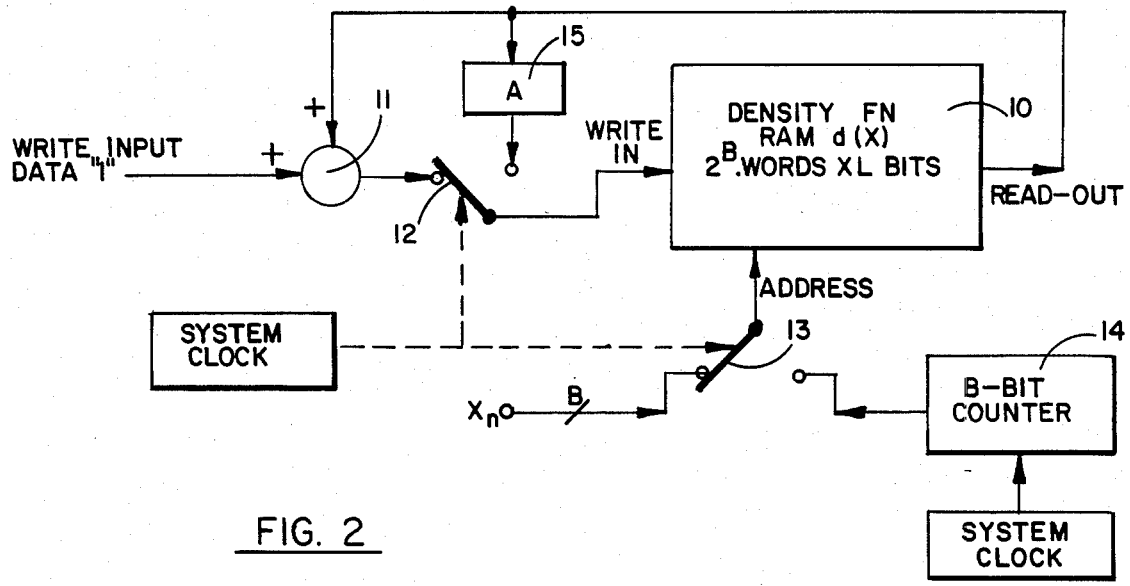
FIG. 2 is a block diagram illustrating an aspect of the inventive concept.

Each time the input signal $x_n$ in FIG. 2 equals a given one of a set of preselected values, the content of memory location (x) is incremented by one. There is, of course, a limit. If only S samples would be applied to the input, then the word lengths in the memory should be L=$\log_2$ S bits. Although such batch mode is often of interest, the more useful case is one in which the input, $x_n$, is of indefinite length. However the memory contents then need be somehow rescaled so the L-bit capacity of the memory is not exceeded. One means to accomplish this is to lowpass filter, or short time average, the memory contents at the same rate that new inputs are being applied, as indicated by the alternative switching mode of RAM element 13 in FIG. 2 in cooperation with elements 10, 12, 14 and 15, and as illustrated by the alternative arrangement of RAM No. 1 and No. 3 with the normalizer in FIG. 1.

In the prior art arrangement of FIG. 1, RAM No. 3 is operated at the sample data rate for sampling the input $x_n$, while RAM No. 1 is operated at an extremely high speed, compared to RAM No. 3. In other words, RAM No. 1 is employed somewhat in the manner of a formatter and buffer storage of recent short-term histogram data, while histogram RAM No. 1 rapidly steps through the entire list of memory addresses within less than one $X_n$ word time to sort and combine the buffer RAM No. 3 data with the appropriate history for each discrete amplitude of interest, as more fully disclosed in the above-noted U.S. Pat. No. 4,315,319.

By means of the concept of the present invention, only a single RAM is employed in mechanizing the histogram or density function d(x) generator; the formatter-buffer RAM No. 3 of FIG. 1 is obviated and the single histogram memory RAM is operated at merely twice the sample data rate of $X_n$ and in two alternate modes of operation, to be more fully disclosed hereinafter. Thus, in addition to the elimination of one RAM, a simplification in the clocking requirements is allowed.

In such efficient arrangement the multiplexed memory is operating at twice the input data-sampling rate for $x_n$ and in two different modes of operation. Interleaved with the loading in of B-bits of new information, $x_n$, a B-bit counter 14 is continually stepped through memory 10, scaling the contents by some attenuation constant, A, (via element 15) and reloading the memory 10 with the attenuated value. For example, assume that the memory 10 at some location contains a value, V, which results from some constant input amplitude. This condition would determine a worst-case memory bit-length requirement. This value may be related to the maximum capacity of the memory, $M = 2^L$ by the relationship $$M \cdot A = [V + 2^B]A = V \qquad (1)$$

Rearranging:

$$M = V + 2^B \qquad (2)$$

which indicates that for the occurrence of $2^B$ input samples (and they could all be the same value), the rescaling (via element 15) steps through the $2^B$ memory locations of memory 10.

In other words, the largest histogram value which can be read out is V, but a temporary storage capacity as great as M is needed for element 10. For computational simplicity, the attenuation factor A (for element 15) will be restricted to the form:

$$A = 1 - 2^{-E} \qquad (3)$$

Substituting Equation (3) for the coefficient A in Equation (1):

$$V = \frac{2^B A}{1-A} = \frac{2^B(1-2^{-E})}{1-(1-2^{-E})} = 2^{B+E} - 2^B \qquad (4)$$

Now, substituting Equation (4) for the term V in Equation (2):

$$M = 2^L = V + 2^B = 2^{B+E} \qquad (5)$$

Therefore, $$L = B + E \qquad (6)$$

The attenuation factor, A, of element 15 is related to the time constant, $\tau$, of the memory decay by $$A = e^{-T/\tau} \qquad (7)$$

where the actual sampling interval of any one memory location is $$T = 2^B / f_s \qquad (8)$$

and where $f_s$ is the rate at which the input $x_n$ is sampled. Then, $$A = 1 - 2^{-E} = e^{-2^B \tau / f_s} \qquad (9)$$

Solving for E in Equation (9):

$$E = -\log_2(1 - e^{-2^B / \tau f_s}) \qquad (10)$$

Experience has shown that a $\tau f_s$ product between $5 \times 10^3$ and $10^6$ is in a most useful range.

For practical applications involving audio and video signals, a useful combination of values for B and $f_s$ may be B = 12 and $f_s$ = 50,000. An observed range of values of E, L and $\tau$ are set forth in Table I as follows:

TABLE I

| E | L | $\tau$ |
|---|---|---|
| 1 | 13 | 0.12 |
| 2 | 14 | 0.28 |
| 3 | 15 | 0.61 |
| 4 | 16 | 1.27 |
| 5 | 17 | 2.58 |
| 6 | 18 | 5.20 |
| 7 | 19 | 10.44 |
| 8 | 20 | 20.93 |

Figure 3:
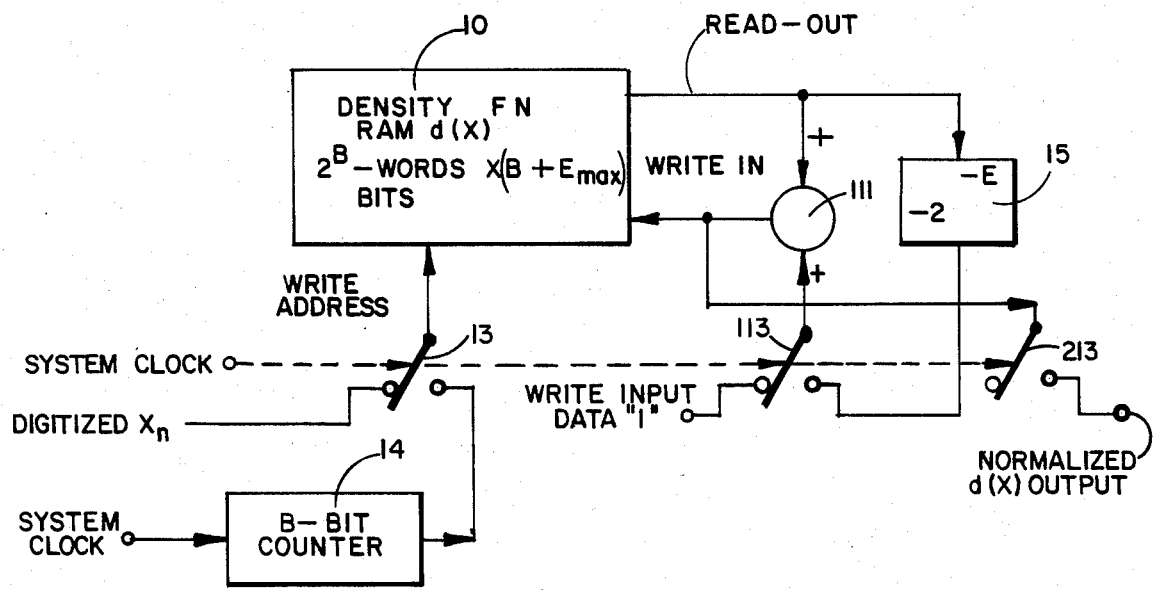
FIG. 3 is a block diagram illustrating a further aspect of the invention, by which a single RAM is multiplexed to provide a normalized amplitude density function d(x).

The basic normalization feature described above in connection with FIG. 2 is shown in more particularity in FIG. 3.

Referring now to FIG. 3 there is shown a RAM 10 adapted to be responsive to a sampled input $x_n$ of maximum word length (B + $E_{max}$) bits and having a capacity of $2^B$ words, and cooperating with an attenuation element 15 for providing an attenuation factor, $-2^{-E}$.

The input sample, $x_n$, is picked up by switch 13 (shown ganged with switches 113 and 213 and toggled to the left) through which the input addresses that memory location (of element 10) which is numerically equal to the value of $x_n$. Through switch 113 the value of the content of the memory location is augmented by 1 and placed back into memory 10. During a latter portion of the same clock period the switches 13, 113 and 213 then toggle to the right. The state of B-bit counter 14 is now the memory address. The content of that memory location is scaled by $(1-2^{-E})$ by the cooperation of elements 15, 111 and 113, and readback into the memory and (via switch 213) is added to an accumulator (in FIG. 4) which is utilized to form the amplitude distribution function. At the beginning of the next clock period ganged switches 13, 113 and 213 toggle again to the left.

Figure 4:
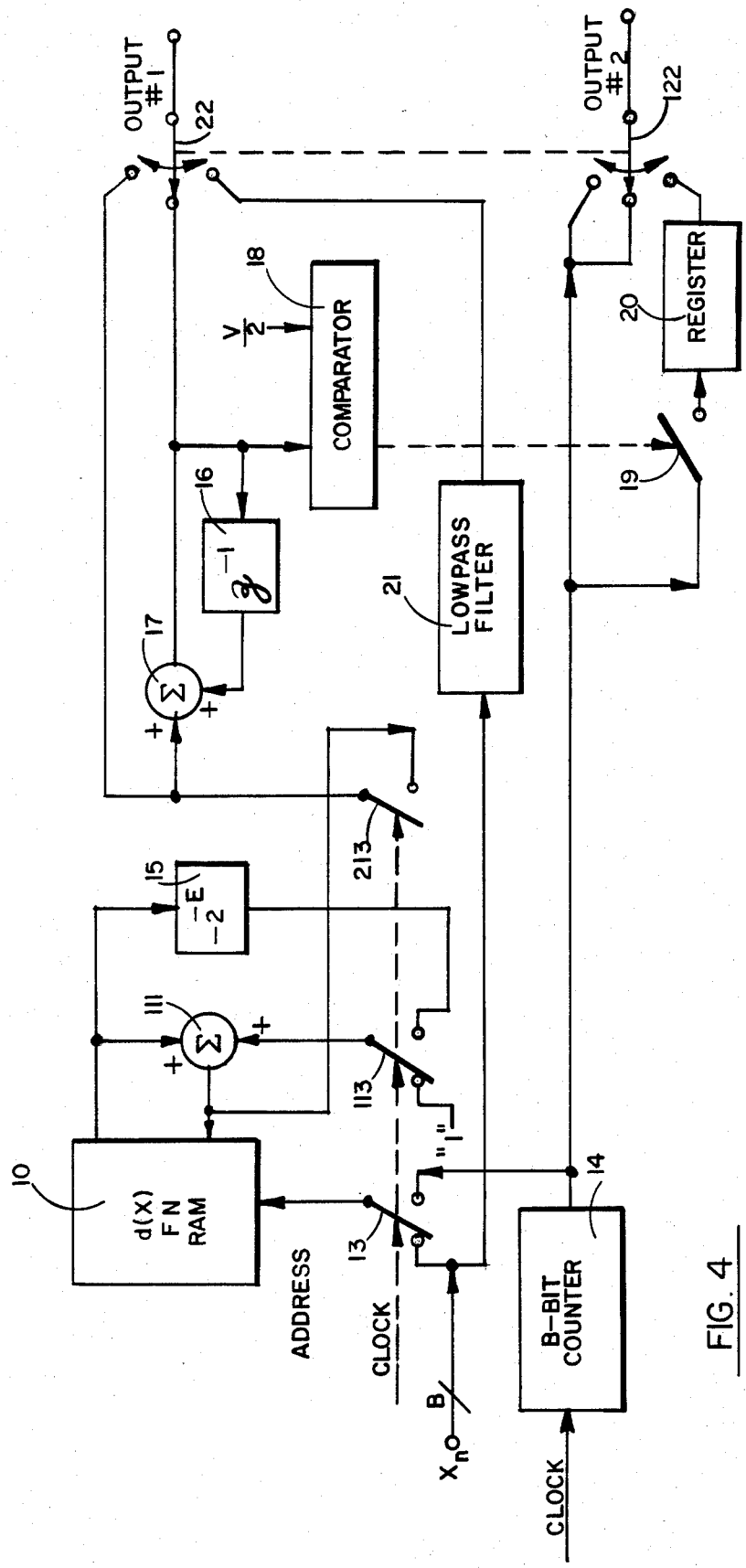
FIG. 4 is a block diagram of a multi-function system for generating various functions of an applied digital input, including a normalized amplitude distribution function, D(x).

Referring now to FIG. 4, there is illustrated in block diagram form a further aspect of the invention in which an accumulator or digital integrator comprising a recirculating register 16 (serving as a one-word delay element, $z^{-1}$) in cooperation with a digital summer 17 generates the amplitude distribution function, D(x). There is also included a comparator or thresholded control signal means 18 for driving a switch 19.

When the value in the accumulator-register 16 equals one half the value V, comparator 18 closes switch 19 and captures the counter state of counter 14 in a register 20. Such captured value is the median value of $x_n$, where the thresholded value ($\frac{1}{2} \cdot V$) for comparator 18 is one half the maximum value for the function D(x). Because the mean is also a convenient value to have with the median, the value $x_n$ is scaled and lowpass filtered or averaged by element 21 in order to generate the mean, using the same scale factor and time constant as that of the histogram memory. The construction and arrangement of lowpass filter 21 is well understood in the art, as shown for example in U.S. Pat. No. 3,639,739 issued to R. M. Golden and S. A. White for DIGITAL LOW-PASS FILTER. Accordingly, element 21 is shown in block form only for convenience in exposition.

There is further provided in FIG. 4 a ganged pair of three-pole output switches 22 and 122 for selectively providing a pair of output combinations from among a preselected combination of alternative outputs. When output switches 22 and 122 are both in the "up" position the outputs will be stepping through the values of the amplitude-density function; i.e., the output on switch 122 will be sequential discrete values of the input variable $x_n$ and the output on switch 22 will be the corresponding value of the function d(x). When switches 22 and 122 are in the center position (as illustrated) the outputs will be stepping through the values of the amplitude-distribution function D(x) vs. $x_n$. When these switches are in the bottom position the outputs will be the mean and median values of the input, $x_n$.

218 (via the appropriate reference register) and select the appropriate output by means of the output switch combination.

Figure 5:
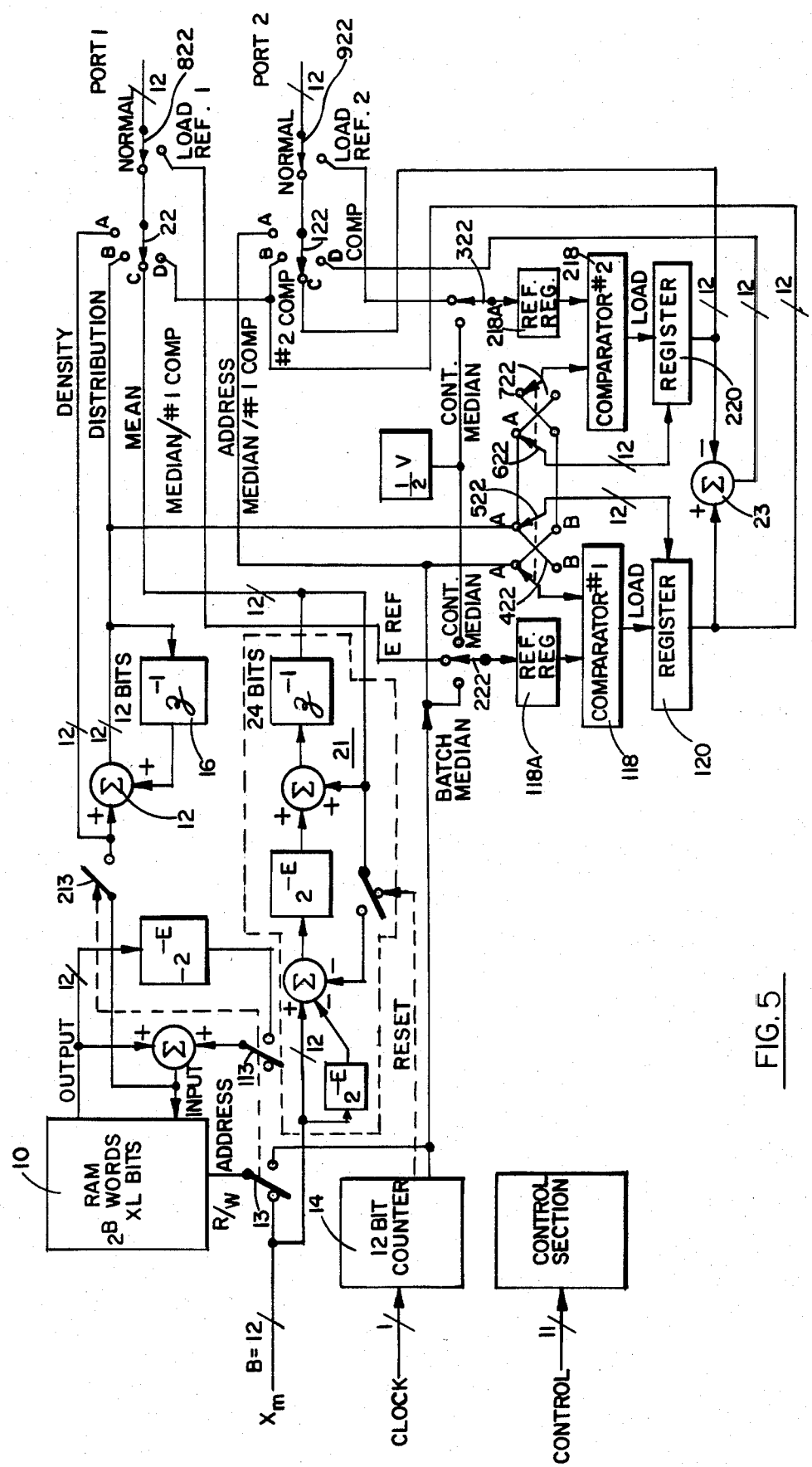
FIG. 5 is a block diagram of a further multi-function computing arrangement, suitable for implementation as an integrated design multi-function chip.

Specific combinations of switch settings for selected combinations of outputs for the arrangement in FIG. 5 are set forth in further particularity in Table III, employing the switch coding set forth in Table II, below. Note that SW #4 is a double-pole, double-throw switch comprised of elements 422 and 522 in FIG. 5, while SW #5 is a similar double-pole, double-throw switch comprised of elements 622 and 722.

TABLE II

| ELEMENT | SW # |
|---------|------|
| 22 | 1 |
| 122 | 2 |
| 222 | 3 |
| 422, 522 | 4 |
| 622, 722 | 5 |
| 322 | 6 |
| 822 | 7 |
| 922 | 8 |

TABLE III

| | SWITCHES | | | | | | | | READOUT |
|---|---|---|---|---|---|---|---|---|---|
| | 1 | 2 | 3 | 4 | 5 | 6 | 7 | 8 | |
| SETTING | A | A | * | * | * | * | A | A | Amplitude Density Function; x on Port 2, d(x) on Port 1 |
| | B | A | * | * | * | * | A | A | Amplitude Distribution Function; X on Port 2, D(x≦X) on Port 1 |
| | C | * | * | * | * | * | A | * | Mean on Port 1 |
| | D | * | C | B | * | * | A | * | Median on Port 1 for Continuous Input |
| | D | * | A | B | * | * | A | * | Median on Port 1 for Batch Input |
| | D | * | B | A | * | * | A | * | D(x≦X) on Port 1 for X having been loaded via SW 7 on B, Port 1 |
| | D | * | B | B | * | * | A | * | X on Port 1 for D(x≦X) having been loaded via SW 7 on B, Port 1 |
| | * | B | C | B | * | * | * | A | Median on Port 2 for Continuous Input |
| | * | B | A | B | * | * | * | A | Median on Port 2 for Batch Input |
| | * | B | B | A | * | * | * | A | D(x≦X) on Port 2 for X having been loaded via SW 7 on B, Port 1 |
| | * | B | B | B | * | * | * | A | X on Port 2 for D(x≦X) having been loaded via SW 7 on B, Port 1 |
| | * | C | * | * | B | B | * | A | Median on Port 2 for Continuous Input |
| | * | C | * | * | A | A | * | A | D(x≦X) on Port 2 for X having been loaded via SW 8 on B, Port 2 |
| | * | C | * | * | B | A | * | A | X on Port 2 for D(x≦X) having been loaded via SW 8 on B, Port 2 |
| | * | D | B | A | A | A | * | A | D($X_1$<x≦$X_2$) on Port 2 for $X_1$ having been loaded via SW 8 on B, Port 2 and $X_2$ having been loaded via SW 7 on B, Port 2 |

* = Don't care (i.e., nonconflicting functions may be run simultaneously)

At least three more important sets of information may be obtained for a data description of the signal $x_n$ by the addition of a second comparator, a subtractor, and means for loading reference values into the comparators, as shown in FIG. 5.

Referring now to FIG. 5, there is illustrated the data processing arrangement of FIG. 4 in which comparator 18 and register 20 are replaced by comparators 118 and 218 and registers 120 and 220, and in which reference registers 118A and 218A, respectively, are interposed at respective reference inputs of comparators 118 and 218. In order to determine the probability that the signal amplitude is below a given level, such level value is entered into the reference register of a comparator and the appropriate output selected by means of the output switch combination.

In order to determine the probability that a signal amplitude of interest is between a given pair of levels, a respective one of those level values is entered into a corresponding one of the reference registers of each of comparators 118 and 218, and the appropriate output of interest again selected by means of the output switch combination from the output of subtractor 23.

Inverse distribution functions $[D(x)]^{-1}$ are also available. In order to determine an amplitude value which the input signal $x_n$ does not exceed for a predetermined percentage of the time, one need only input such percentage as a probability to one of comparators 118 or 218 (via the appropriate reference register) and select the appropriate output by means of the output switch combination.

Accordingly, there has been described an efficient digital data processing device for generating a plurality of functions as a sampled input. Although the concept of integrated design for a histogram generator has been described and illustrated in detail, it is to be clearly understood that the same is by way of illustration and example only and is not to be taken by way of limitation, the spirit and scope of this invention being limited only by the terms of the appended claims.

I claim:

1. A digital data processor adapted to be responsive to an applied signal input ($x_n$) for generating an output signal indicative of a preselected function of said signal input, and comprising:

a clocked counter for providing a clocked counter output;

multiplexing means having a multiplexing means output and having inputs responsive to said applied signal input and said clocked counter output, said multiplexing means operating to toggle said multiplexing means output to alternate between said applied signal input and said clocked counter output;

signal sampling memory means adapted to be responsive to an alternate one of said applied input signal and said clocked counter output provided by said multiplexing means output as a read/write address for generating a statistical amplitude density function d(x) representing the number of occurrences of an amplitude of a sampled input x by alternating said memory means between a first mode in which input data is loaded into said memory means responsive to said applied input signal, and a second mode in which data stored in said memory means is attenuated in said memory means responsive to said clocked counter output;

digital attenuating means interposed between a readout and read-in of said memory means during said second mode in which said memory means is responsive to said clocked counter output for low-pass filtering the amplitude density function as to be independent of the size of the sampled population of the sampled signal ($x_n$); and output means for producing said output signal in response to data stored in said memory means.

2. The device of claim 1 in which said output means comprises digital integration means responsive to said low-pass filtered amplitude density function during said second mode for providing said output signal indicative of a normalized amplitude distribution function D(x) of the applied signal input ($x_n$).

3. The device of claim 2 in which said digital integration means comprises an accumulator means having a first input responsive to said sampled amplitude density function and further having a second input responsive to a delayed output of said accumulator.

4. The device of claim 2 in which there is further provided:

a digital low pass filter adapted to be responsive to said applied signal input ($x_n$) for providing a signal indicative of mean value of said applied signal input; and switching means for selectively providing an alternative one of said amplitude density function, amplitude distribution function, and said mean value of said applied signal input ($x_n$).

5. The device of claim 4 in which said digital low pass filter comprises:

digital integrating means having an input and an output digital subtractive combining means having a first input responsive to the sampled input ($x_n$) and having a negative feedback input responsively coupled to the output of said digital integrating means, and further having an output coupled to said input of said digital integrating means.

6. The device of claim 5 in which said negative feedback input has a sampling rate equal to and synchronized with a resetting of said clocked counter.

7. The device of claim 2 in which there is further included means for selectively providing an output indicative of a median value of the sampled input ($x_n$), corresponding to that value for which the number of sampled values above such median value is equal to the number of sampled values below such median value.

8. The device of claim 7 in which said means for providing a median value output comprises a register having an output and further having a gated input responsive to said output of said counter only during the intervals that said amplitude distribution function output is equal to one-half the normalized maximum of the amplitude distribution function, D(x).

9. The device of claim 7 in which said means for providing a median value output comprises:

a register having an output and further having an input responsively coupled to said output of said address counter; and gating means interposed at said input of said register and having a gating control input responsive to said amplitude distribution function for gating-on said register input only during an interval when said amplitude distribution function is equal to one-half the normalized maximum of the amplitude distribution function, D(x).

10. The device of claim 7 in which said means for providing a median value output comprises:

a register having an output and further having an input responsively coupled to said output of said address counter; and gating means interposed at said input of said register and having a gate control input responsive to said gate control signal for gating-on said input during the occurrence thereof.

11. The device of claim 1 in which there is further provided:

sampling digital integration means responsive to said low-pass filtered amplitude density function during said sampling intervals for providing an output indicative of a normalized amplitude distribution function D(x) of the signal input ($x_n$), and first output switching means selectively responsive to an alternative of one of said amplitude density function and amplitude distribution function.

12. Signal sampling means adapted to be responsive to an applied signal input (x) for generating a statistical amplitude distribution function D(x) and comprising:

a clocked counter for providing a clocked counter output;

multiplexing means having a multiplexing means output and having inputs responsive to said applied signal input and said clocked counter output, said multiplexing means operating to toggle said multiplexing means output to alternate between said applied signal input and said clocked counter output;

random access memory means having a read/write address input responsive to an alternate one of said applied signal input and the output of a clocked counter provided by said multiplexing means output during respective first and second clock sub-intervals of a clocking interval of said signal sampling means, and further having a write input responsive to occurrences of each of a plurality of preselected amplitude samples of the sampled signal for providing during said first clocked sub-interval an output indicative of an amplitude density function d(x) for the sampled input (x), said write input being responsive to a preselected attenuation during said second clock sub-interval; and a digital integrator having an input coupled to said write input of said memory means during said second clock sub-interval and having an output indicative of said amplitude distribution function.

13. The device of claim 12 in which said digital integrator comprises an accumulating register for integrating the amplitude density function d(x) of said memory means to produce said amplitude distribution function D(x).

14. Signal sampling means adapted to be responsive to an applied signal input (x) and a clocked center output for generating a preselected statistical amplitude function and comprising a multiplexer for selecting between said applied signal input and said clocked counter output, and random access memory means having a read/write address input responsive to an alternate one of said applied signal input and the output of a clocked counter provided by said multiplexer during respective first and second clock sub-intervals of a clocking interval of said signal sampling means, and further having a write input responsive to the occurrences of each of a plurality of preselected amplitude samples of the sampled signal and for storing the cumulative number of said occurrences as data in said memory means, said write input being responsive to a preselected attenuation during said second clock sub-interval for attenuating the data stored in said memory means; said signal sampling means further comprising an amplitude density function output for providing during said first clocked sub-interval an output indicative of an amplitude density function $d(x)$ for the sampled input $(x)$.

15. The device of claim 14 in which there is further provided a digital accumulating register responsive to said amplitude density function output of said memory means for providing an output indicative of a statistical amplitude distribution function, $D(x)$.

16. Signal sampling means demonstrating a first and second clock sub-interval of a clock interval and adapted to be responsive to an applied signal input $(x)$ for generating a preselected statistical amplitude density function $d(x)$ and comprising:

a clocked counter having a $2^B$ work size and for providing a clocked counter output;
multiplexing means having a multiplexing means output and having inputs responsive to said applied signal input and said clocked counter output, said multiplexing means operating to toggle said multiplexing means output to alternate between said applied signal input and said clocked counter output;
digital sign-inverting and attenuating means $(-2^B)$;
arithmetic combining means responsive to the occurrences of each of preselected amplitude samples of the sampled signal $(x)$ during said first clock sub-interval and coupled to an output of said attenuating means during said second clock sub-interval;
a random access memory means having a read/write address input responsive to an alternate one of said applied signal input and said output of said clocked counter provided by said multiplexing means output during a respective one of said first and second clock sub-intervals, and further having a write input responsive to the output of said arithmetic combining means; and
each of said arithmetic combining means and said attenuating means being further responsive to a read output of said random access memory means, whereby the output of said combining means is indicative of said amplitude density function.

17. A digital data processor adapted to be responsive to an applied signal input $(x_n)$ for generating an output signal indicative of a normalized amplitude distribution function of said signal input, and comprising:

a clocked counter for providing a clocked counter output;
multiplexing means having a multiplexing means output and having inputs responsive to said applied signal input and said clocked counter output, said multiplexing means operating to toggle said multiplexing means output to alternate between said applied signal input and said clocked counter output;
signal sampling memory means adapted to be responsive to an alternate one of said applied input signal and said clocked counter output as a read/write-address provided by said multiplexing means output for generating a statistical amplitude density function $d(x)$ representing the number of occurrences of an amplitude of a sampled input x;
digital attenuating means interposed between a read-out and write-in of said memory means during sampling intervals in which said memory means is responsive to said clocked counter output for low-pass filtering the amplitude density function to be dependent of the size of the sampled population of the sampled signal $(x_n)$; and
digital integration means responsive to said low-pass filtered amplitude density function during said sampling intervals for providing an output indicative of a normalized amplitude distribution function $D(x)$ of the applied signal input $(x_n)$.

* * * * *